(12) United States Patent
Kim et al.

(10) Patent No.: US 9,261,736 B2
(45) Date of Patent: Feb. 16, 2016

(54) LIQUID CRYSTAL DISPLAY

(71) Applicant: Samsung Display Co., Ltd., Yongin, Gyeonggi-Do (KR)

(72) Inventors: Yeun Tae Kim, Hwaseong-si (KR); Dae Ho Song, Hwaseong-si (KR); Soo Jung Lee, Yongin-si (KR); Hee-Keun Lee, Suwon-si (KR); Ji Yeon Choi, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/464,508

(22) Filed: Aug. 20, 2014

(65) Prior Publication Data

US 2015/0160488 A1    Jun. 11, 2015

(30) Foreign Application Priority Data

Dec. 11, 2013  (KR) .......................... 10-2013-0154035

(51) Int. Cl.
G09F 9/00 (2006.01)
G02F 1/1335 (2006.01)
G02F 1/1341 (2006.01)
G02F 1/1333 (2006.01)

(52) U.S. Cl.
CPC ........ *G02F 1/1341* (2013.01); *G02F 1/133377* (2013.01)

(58) Field of Classification Search
CPC .................... G02F 1/136209; G02F 1/133512; G02F 1/1362; H01L 29/66742; H01L 29/78
See application file for complete search history.

(56) References Cited

U.S. PATENT DOCUMENTS

| 8,299,997 | B2* | 10/2012 | Goto | ................. G02F 1/133617 257/72 |
| 8,564,516 | B2* | 10/2013 | Kim | ...................... G02F 1/1345 345/87 |
| 2013/0308071 | A1 | 11/2013 | Kim | |
| 2014/0203301 | A1 | 7/2014 | Kim | |

FOREIGN PATENT DOCUMENTS

JP    2013-242556    12/2013
KR    10-2012-0026880 A    3/2012

* cited by examiner

*Primary Examiner* — Tracie Y Green
(74) *Attorney, Agent, or Firm* — Innovation Counsel LLP

(57) ABSTRACT

The substrate of a liquid crystal display has a non-square rectangular shape and is bent such that the longer edges of the rectangular shape are nonlinear while the shorter edges are linear. Liquid crystal containerizing micro-cavities of the display are organized to be elongated in the extending direction of the nonlinear longer edges of the substrate while gate lines and liquid crystal injection holes forming areas are formed extending in the extending direction of the linear shorter edges of the substrate. Concentration of mechanical stresses may be reduced due to this configuration.

14 Claims, 19 Drawing Sheets

LIQUID CRYSTAL DISPLAY

CROSS-REFERENCE TO RELATED APPLICATION

This application claims priority to and the benefit of Korean Patent Application No. 10-2013-0154035 filed in the Korean Intellectual Property Office on Dec. 11, 2013, the entire contents of which application are incorporated herein by reference.

BACKGROUND (a) Technical Field

The present disclosure of invention relates to a liquid crystal display (LCD) having a bent screen and more specifically to one in which the liquid crystals are encapsulated in micro-cavities.

(b) Description of Related Technology

A liquid crystal display (LCD) is one of the flat panel displays that are currently most widely used. LCD's typically include two panels where at least one of them has electric field generating electrodes disposed thereon, such as pixel electrodes and a common electrode, where a liquid crystal layer is disposed therebetween.

The LCD is configured to produce electric fields extending through the liquid crystal layer by applying corresponding voltages across the electric field generating electrodes. The produced electric fields determine corresponding alignments of local liquid crystal molecules of the liquid crystal layer. A displayed image is then formed by using the oriented liquid crystals for controlling polarization of incident light.

One technique for implementing a LCD display involves forming a plurality of micro-cavities for a respective one or more pixels and filling the micro-cavities with liquid crystal such that liquid crystal material is containerized in the areas where the micro-cavities are present. When the micro-cavities technology is used, the typical two-panel configuration for the LCD is no longer needed and it is possible to reduce a weight, a thickness, and the like, of the LCD by forming constituent elements on only a single substrate.

One class of LCD's uses a flexible substrate whereby the LCD is rendered bendable. In this instance, excessive stress may become concentrated on structural points at which the micro-cavities are formed.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a liquid crystal device that includes liquid crystal containerizing micro-cavities and is bendable, where the device is configured to reduce stress concentration within the bent structure.

More specifically, the substrate of the liquid crystal display device has a non-square rectangular shape and it is bent such that the longer edges of the rectangular shape are nonlinear when viewed from the side while the shorter edges are linear. Liquid crystal containerizing micro-cavities of the display area are organized to be elongated in the extending direction of the nonlinear longer edges of the substrate while gate lines and liquid crystal injection holes forming areas (e.g., troughs) are formed extending in the extending direction of the linear shorter edges of the substrate. Concentration of mechanical stresses may be reduced due to this configuration because stress from bending is distributed along the direction of the longer length longer sides of the substrate.

An exemplary embodiment of the present disclosure provides a liquid crystal display, including: a substrate provided in a rectangular shape including a single pair of long sides and a single pair of shorter sides, and including a display area for displaying an image and a peripheral area positioned around the display area; a plurality of pixels arranged in a matrix form within the display area; a thin film transistor connected to each pixel; a pixel electrode connected to the thin film transistor; a roof layer disposed spaced apart from and facing the pixel electrode; a micro-cavity disposed between the pixel electrode and the roof layer; and a liquid crystal material injected into the micro-cavity. Each pixel is provided in a rectangular shape including a single pair of long pixel sides and a single pair of shorter short pixel sides, and the long side of the pixel is in parallel with the long side of the substrate, and the short side of the pixel is in parallel with the short side of the substrate, the substrate is bent toward a direction in which the long side of the substrate is extended, and a liquid crystal injection holes forming area (trough) is extended in a direction in which the short side of the substrate is extended.

The liquid crystal display may further include: a gate line connected to the thin film transistor, and configured to transfer a gate signal to each pixel; and a data line connected to the thin film transistor, and configured to transfer a data signal to each pixel. The gate line may be extended in the direction in which the short side of the substrate is extended, and the data line may be extended in the direction in which the long side of the substrate is extended.

The liquid crystal display may further include: a plurality of gate drivers disposed on the peripheral area and connected to the gate lines; and a plurality of data drivers disposed on the peripheral area and connected to the data lines.

The gate drivers may be disposed along a long side portion of the substrate.

The gate drivers may be monolithically integrated on the substrate.

The data drivers may include a plurality of first data drivers and a plurality of second data drivers respectively disposed on opposed short side portions of the substrate.

An odd numbered data line among the data lines may be connected to the first data driver, and an even numbered data line among the data lines may be connected to the second data driver.

Each micro-cavity may containerize liquid crystal material corresponding to a respective single pixel.

The liquid crystal injection holes forming area may be disposed between the respective pixels in the direction in which the long side of the substrate is extended.

The micro-cavities may extend over a length corresponding to two or more pixels consecutively continued in the direction in which the long side of the substrate is extended.

The liquid crystal injection holes forming area may be disposed between the plurality of pixels consecutively continued in the direction in which the long side of the substrate is extended.

The liquid crystal display may further include a capping layer disposed on the roof layer, and the capping layer may cover the liquid crystal injection holes forming area so as to seal closed the liquid crystal injection holes.

The liquid crystal display may further include a common electrode and a lower insulating layer disposed between the micro-cavity and the roof layer, and the lower insulating layer may be disposed on the common electrode.

The liquid crystal display may further include an upper insulating layer disposed between the roof layer and the capping layer.

According to exemplary embodiments of the present invention, it is possible to reduce stress applied to a structure constituting a micro-cavity by extending a liquid crystal injection hole forming area in a direction in which a short side of a substrate is extended, which is a direction in which a liquid crystal display is not bent.

Also, it is possible to prevent a voltage drop of the gate lines from excessively dropping due to the stress by extending the gate lines along the direction of the short sides of the substrate and by disposing a relatively small number of gate line drivers in a direction in which the liquid crystal display is bent, that is, an upper end portion of the substrate that is a long side portion of the substrate.

DETAILED DESCRIPTION

Figure 1:
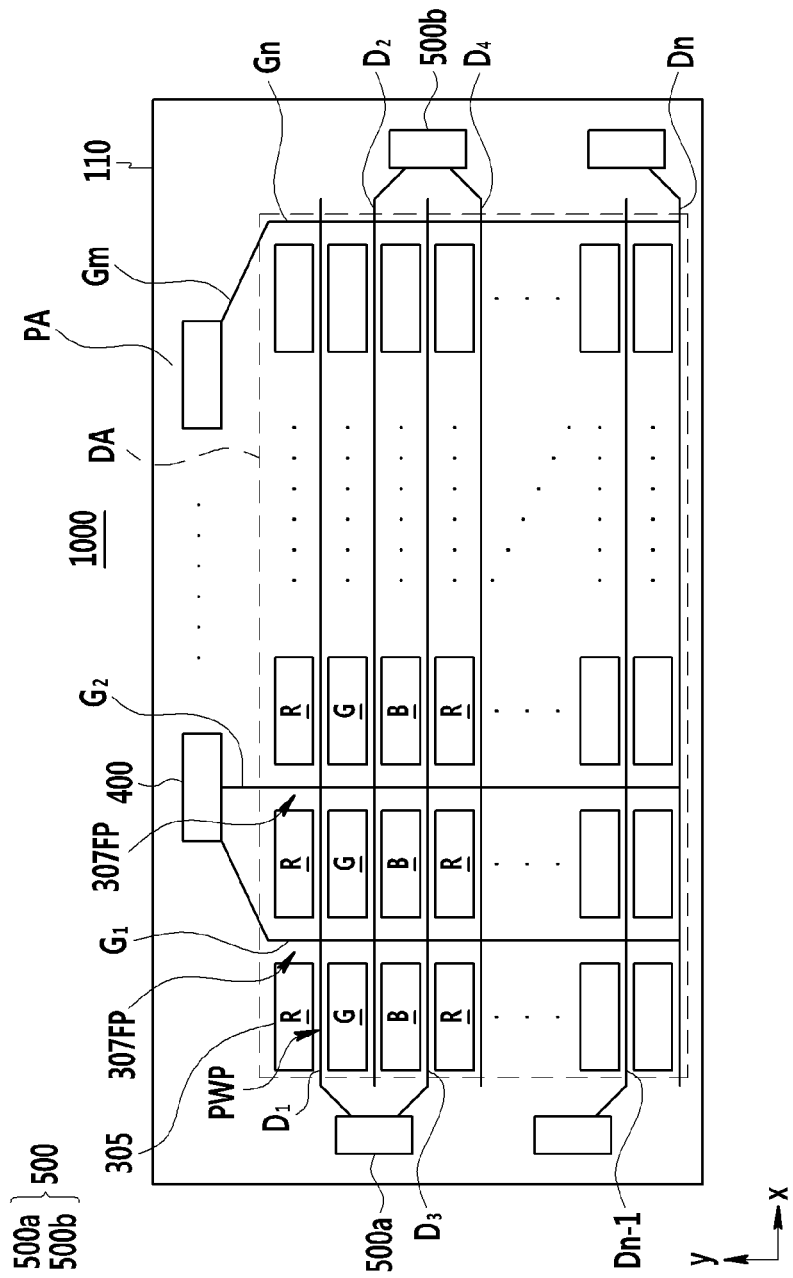
FIG. 1 is a top plan view of a liquid crystal display (LCD) according to a first exemplary embodiment in accordance with the present disclosure of invention.

Exemplary embodiments in accordance with the present disclosure of invention will be described in detail with reference to the accompanying drawing. However, the present teachings are not limited to the exemplary embodiments described herein and may be embodied in various other forms. The exemplary embodiments introduced herein are provided to fully complement and supplement the disclosed description and to sufficiently transfer the spirit of the present teachings to those skilled in the art.

In the drawings, thicknesses of layers and areas are exaggerated for clarity. Also, when a layer is described to be "on" another layer or a substrate, the layer may be directly formed on the other layer or the substrate, or a third layer may be disposed between the layer and the other layer or the substrate. Throughout the specification, portions indicated using like reference numerals refer to like constituent elements.

FIG. 1 is a top plan schematic view of a liquid crystal display (LCD) 1000 according to a first exemplary embodiment.

Referring to FIG. 1, the LCD 1000 according to the present exemplary embodiment includes a flexible substrate 110 and a plurality of gate lines drive circuits 400 and a plurality of data lines driver circuits 500 disposed on the substrate 110 for example either as monolithically integrated circuits directly integrated with the substrate 110 or as integrated circuit chips mounted on the substrate 110.

The substrate 110 is provided in the form of an elongated rectangular shape including an opposed pair of long sides extending in an X-axis direction and an opposed pair of short sides extending in a Y-axis direction. The top major surface of the substrate 110 is subdivided into a display area DA configured for displaying an image and into a non-displaying peripheral area PA positioned around the display area DA. In the present exemplary embodiment, the X-axis directed long sides are shown in FIG. 1 to be extended in a horizontal direction of the schematic drawing, and the Y-axis directed short sides are shown in FIG. 1 to be extended in a vertical direction of the schematic drawing. That is, in the substrate 110, the lengths of the sides extended in the horizontal direction (in the X direction) are greater than the lengths of the sides extended in the vertical direction (in the Y direction). The substrate 110 is made of a transparent flexible and electrically insulative material such as a transparent plastic.

A plurality of gate lines ($G_1, G_2, \ldots, G_m$), a plurality of data lines ($D_1, D_2, D_3, D_4, \ldots, D_n$), and a plurality of pixels arranged in a matrix form are disposed across the display area DA.

The plurality of pixels includes a red pixel (R), a green pixel (G), and a blue pixel (B). Each pixel is provided in an elongated rectangular shape which is elongated in the same X direction along which the substrate 110 is elongated. More specifically, each pixel has a single pair of opposed long sides and a single pair of opposed short sides. A long side of each pixel is in parallel with a long side of the substrate 110, and a short side of each pixel is in parallel with a short side of the substrate 110.

A liquid crystal injection holes forming area 307FP is disposed between respective adjacent ones of the pixels where the injection holes forming area 307FP is elongated along the Y direction so that micro-cavity filling holes 305 may be formed extending in a direction perpendicular to the elongation direction of the injection holes forming area 307FP, namely, extending in the direction in which the long side of each respective pixel is extended, that is, tin he horizontal direction. More specifically, the liquid crystal injection holes forming area 307FP is extended in the direction in which the short sides of the pixels serviced thereby are extended, that is, the vertical direction. The liquid injection holes forming area 307FP may be in the form of a trough having liquid crystal injection holes formed along both interior sidewalls of the trough as shall be described below. In one embodiment, a single micro-cavity 305 is respectively provided for each corresponding single pixel. The micro-cavity 305 is constituted by a structure of a lower insulating layer 350, a common electrode 270, an upper insulating layer 370, and a roof layer 360, which will be described below, and a liquid crystal material is injected into (e.g., introduced into, by way of capillary action) the micro-cavity 305 so as to substantially fill the micro-cavity.

Also, after the micro-cavities are respectively filled with their respective micro-volumes of liquid crystal material, a partition wall forming portion (PWP—see FIG. 5) is formed between the respective pixels and like the trough of the injection holes forming area 307FP, the partition wall forming portion (PWP) is elongated in the direction in which the short sides of its serviced pixels are extended, that is, in the vertical Y direction. The trough (307FP) which is initially present between split portions of the lower insulating layer 350, the common electrode 270, the upper insulating layer 370, and the roof layer 360, which will be described below, is filled in by the material of the PWP. The PWP-filled structure may therefore partition or define the X direction extents of the respective micro-cavities 305 as closed off (sealed) by the forming of the partition wall.

As indicated in FIG. 1, corresponding ones of the gate lines ($G_1$-$G_m$) that transfer respective gate signals to their respectively serviced columns of pixels and are extended underneath the respective troughs of the injection holes forming area 307FP, namely, in the Y axis direction in which the short sides of the respectively serviced each pixel are extended. Moreover, and as further indicated in FIG. 1, corresponding ones of the data lines ($D_1$-$D_n$) that transfer respective data signals to their respectively serviced rows of pixel and are extended in the direction in which the long sides of their respectively serviced pixels are extended, that is, the horizontal X direction.

The plurality of gate drivers 400 and the plurality of data drivers 500 are disposed on the peripheral area PA. In one embodiment, the data lines driver 500 includes a plurality of first data driver circuits 500a disposed on a left side portion of the substrate 110 and a plurality of second data driver circuits 500b disposed on a right side portion of the substrate 110. The gate lines driver 400 is connected to the gate lines ($G_1$-$G_m$) to apply respective gate signals to the gate lines ($G_1$-$G_m$), the data driver 500 is connected to the data lines ($D_1$-$D_n$) to apply respective data signals to the data lines ($D_1$-$D_n$). Here, odd numbered data lines ($D_1$, $D_3$, ..., $D_{n-1}$) are connected to the first data driver 500a, and even numbered data lines ($D_2$, $D_4$, ..., $D_n$) are connected to the second data driver 500b.

In one embodiment, each gate lines driver circuit 400 is disposed at an upper end portion of the substrate 110 in a form of a single integrated circuit (IC) chip. However, the present disclosure of invention is not limited thereto and each gate lines driver 400 may be monolithically integrated such that it uses thin film transistors Q similar to those of the display area and where the monolithically integrated gate lines driver circuitry is distributively disposed at the upper end portion of the substrate 110.

Each first data driver 500a is disposed on the left side portion of the substrate 110 in a form of a single IC chip, and each second data driver 500b is disposed on the right side portion of the substrate 110 in a form of a single IC chip.

The number of data lines drive units (500) is typically greater than the number of gate lines driver units (400). Accordingly, in conventional setups, the data drive units (similar to 500) are generally distributively disposed across the upper end portion or a lower end portion of the substrate that is a long side portion of the substrate 110. Contrary to this conventional setup, in the present exemplary embodiment, the data lines drive units 500 are distributively disposed across both of the short side portions of the substrate 110, in other words, by disposing the data drivers 500 on both the left side portion and the right side portion of the substrate 110.

Accordingly, a relatively smaller number of gate lines driver units 400 may be disposed at the upper end portion of the substrate 110 that is the longer side of the substrate 110.

Figure 2:
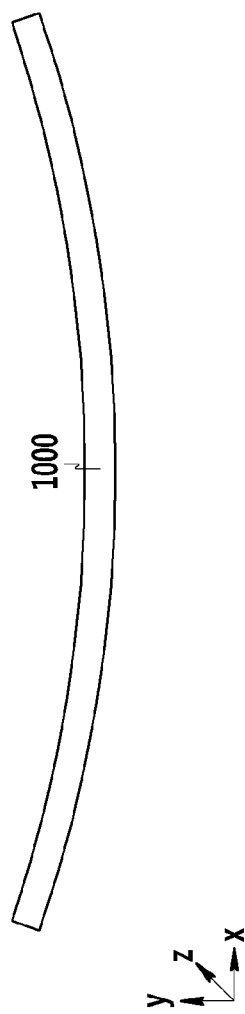
FIG. 2 is a view illustrating a case in which an LCD according to the first exemplary embodiment is bent.

Meanwhile, the LCD 1000 according to an exemplary embodiment of the present disclosure may have a flexible substrate 110 and may be bent, for example about a central Y axis as illustrated in FIG. 2 (which is taken in the plane of the Z-axis and the X-axis).

FIG. 2 is a view illustrating a case in which the LCD 1000 according to an exemplary embodiment that is bent.

When the substrate 110 is made of a non-elastic material such as glass, the LCD 1000 may be maintained in a bent state. When the substrate 110 is a flexible substrate made of a flexible material such as polyethylene naphthalate (PEN), polycarbonate (PC), polyarylate (PAR), polyether imide (PEI), polyether sulfone (PES), and polyimide (PI), the LCD 1000 may be bent and then unbent again.

The present exemplary embodiment illustrates a state in which the LCD 1000 is bent in the direction in which the long side of the substrate 110 is extended, that is, upwardly at its in ends in the Z-direction and about a central Y axis. In this instance, a curvature radius is greater than a length of the long side of the substrate 110.

The liquid crystal injection holes forming area 307FP (trough) for separating the micro-cavities 305 is extended in the direction in which the short side of each pixel is extended, that is, the vertical direction. That is, the liquid crystal injection holes forming area 307FP is extended in the direction in which the short side of the substrate 1110 is extended.

Here, when the LCD 1000 is so bent, mechanical stress may become concentrated at differentiations in structure as disposed along the X direction of the substrate 110 and in particular such differentiations of structure occur at terminal ends of the micro-cavities 305, whereby; if hypothetically-speaking, the elongation directions of the micro-cavities 305 are oriented in the Y direction (which they are not in the disclosed embodiment) the bending strains of the bent LCD 1000 would tend to cause elongated lengths of stress-induced damage such as formation of long cracks along the Y direction of the structure. However, in the present exemplary embodiment, the elongation directions of the micro-cavities 305 are oriented in the X direction; whereby it is possible to more smoothly distribute the stresses developed in the bent structure constituting the micro-cavities 305 and thus reduce the localized concentrations of such stresses, this being done by disposing the liquid crystal injection holes forming area (trough) 307FP to be elongated in the direction in which the LCD 1000 is not bent, that is, in the Y direction in which the direction that the short sides of the substrate 110 are extended along.

Specifically, due to the liquid crystal injection hole forming area 307FP, the structure constituting the micro-cavity 305 is elongated in the direction in which the LCD 1000 is bent, that is, the horizontal direction. Accordingly, the stress, which is applied to the structure constituting the micro-cavity 305 when the LCD 1000 is bent, is spread over a longer distance, less concentrated, and thus reduced at places where the structure of the micro-cavity 305 presents a structural discontinuity.

Also, in the present exemplary embodiment, it is possible to prevent or reduce an RC-based drop of voltage output by the gate lines driver 400 which may be increased due to the stress by disposing the gate drivers 400 at the upper end portion of the substrate 110 such that the gate lines extending in the direction perpendicular to the direction in which the LCD 1000 is bent, that is, the lengths of the gate lines are shortened by extending parallel to the shorter side portion of the substrate 110 and the conductive material(s) of the gate lines are not greatly bent because the bending is in the direction perpendicular to the extension direction of the gate lines.

Additionally, when the gate lines drive circuitry 400 is not provided in a form of separately mounted IC chips and instead, is monolithically integrated together with the other components of the thin film substrate, the mechanical stress on the gate lines drive circuitry 400 is distributed along the longer distance of the long side of the substrate and thus the monolithically integrated gate lines drive circuitry 400 may not be as negatively affected by the stress as if the bending were concentrated over the distance of the short side of the substrate and applied as such in a more concentrated manner to the gate lines or data lines drive circuitries 400 and 500.

Hereinafter, a structure of an LCD according to an exemplary embodiment of the present disclosure of invention will be described in detail with reference to FIGS. 3 through 5.

Figure 3:
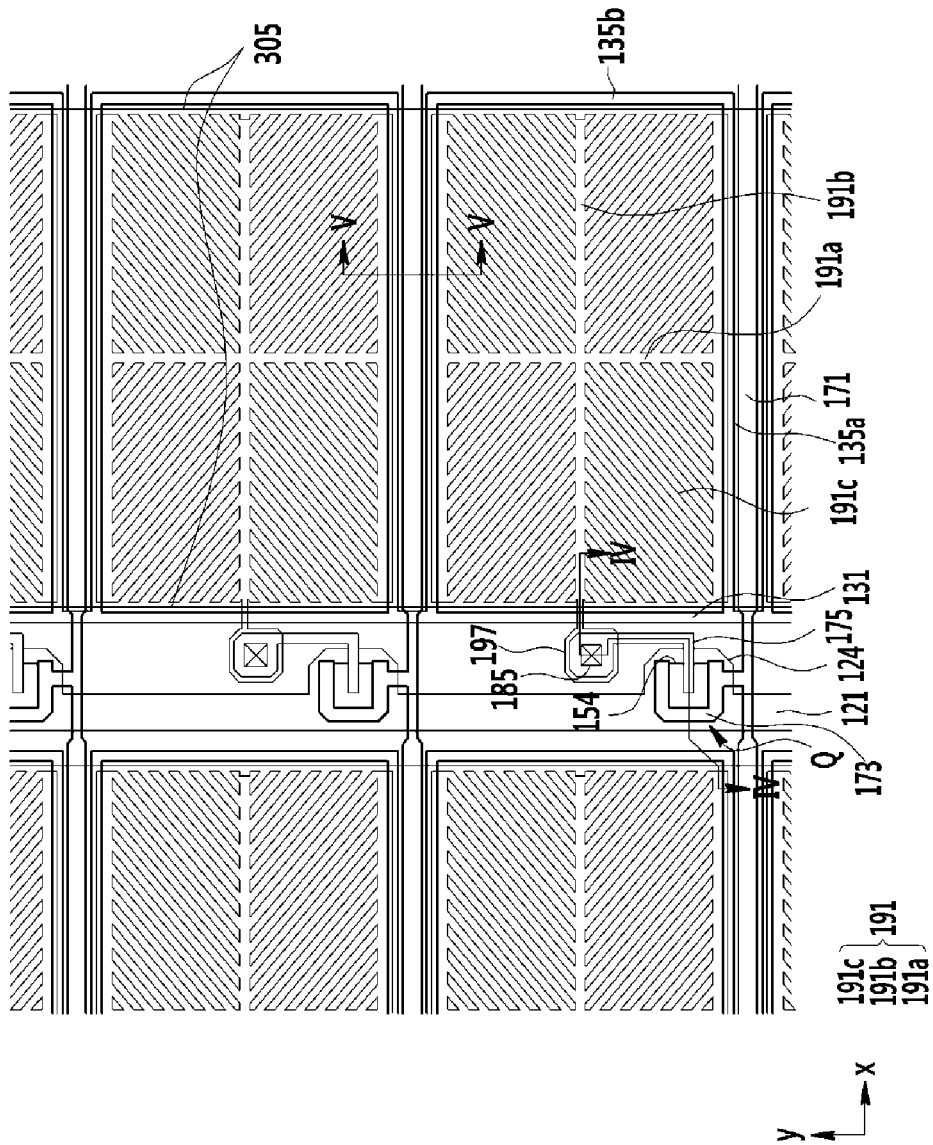
FIG. 3 is a more detailed layout view illustrating a repeated portion of the LCD of FIG. 1.

FIG. 3 is a top plan view illustrating an LCD according to an exemplary embodiment. FIG. 4 is a cross-sectional view taken along cutting-plane line IV-IV of FIG. 3. FIG. 5 is a cross-sectional view taken along cutting-plane line V-V of FIG. 3.

Figure 4:
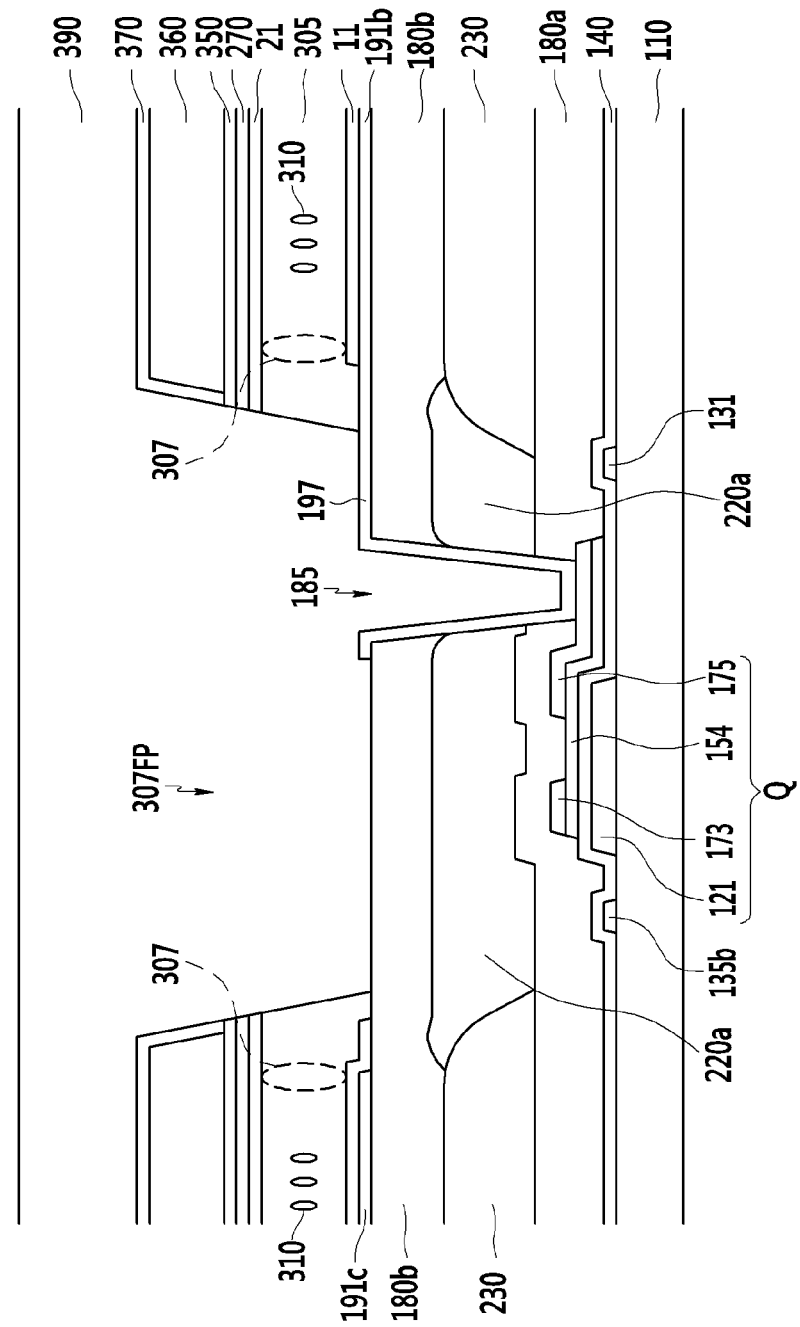
FIG. 4 is a cross-sectional view taken along cutting-plane line IV-IV of FIG. 3.
Figure 5:
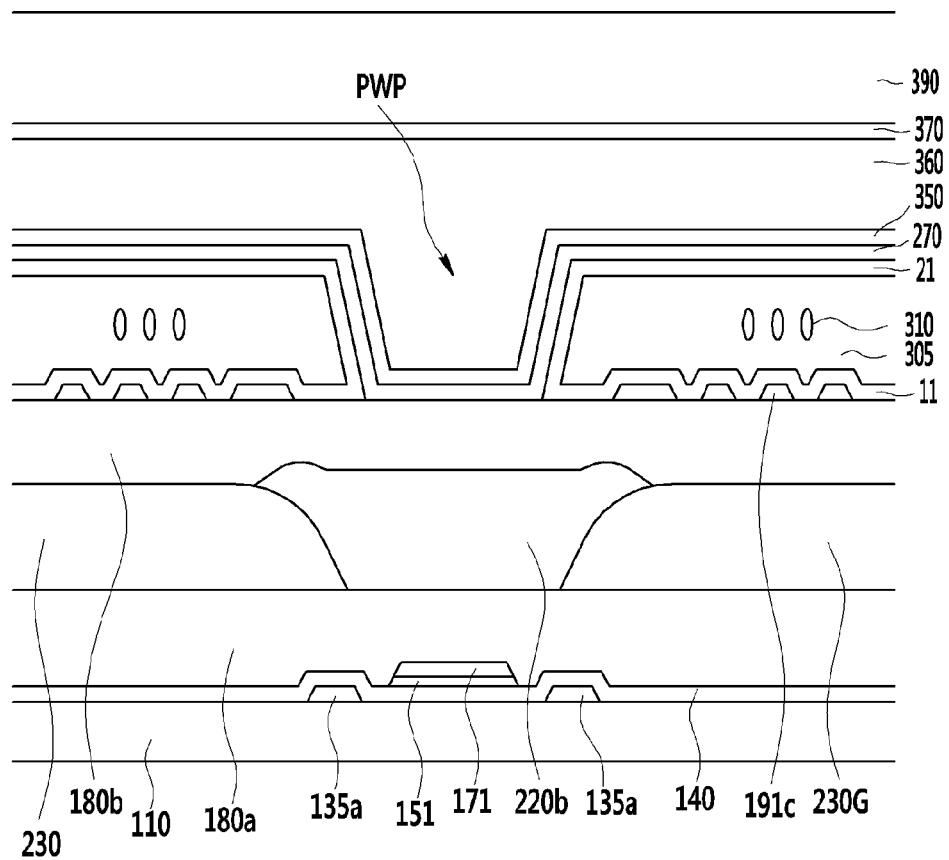
FIG. 5 is a cross-sectional view taken along cutting-plane line V-V of FIG. 3.

Referring to FIGS. 3 through 5, a gate line 121 and a storage electrode line 131 are disposed on a base substrate 110 made of a bendable transparent glass, plastic, and/or the like.

The gate line 121 is generally extended in the vertical direction (Y direction parallel to the shorter side of the substrate 110) and transfers a corresponding gate signal to pixels served by that gate line. The gate line 121 includes gate electrodes 124 integrally protruding (branching) therefrom in the horizontal direction.

The storage electrode line 131 is generally extended in the vertical direction (the Y direction parallel to the shorter side of the substrate 110) and transfers a predetermined voltage such as a common voltage Vcom along that direction for coupling for example to corresponding portion of the common electrode. The storage electrode line 131 includes a spaced apart pair of horizontal portions 135a substantially vertically extended with respect to the vertical gate line 121 and a vertical portions 135b connecting ends of the pair of spaced apart horizontal portions 135a to each other so as to form surrounding boxes around the pixels. In other words, the combination of the horizontally-extending portions 135a and the vertically extending portions 135b of the storage electrode line 131 have a structure that surrounds a pixel electrode 191 to be described below.

A gate insulating layer 140 is disposed on the gate line 121 and the storage electrode line 131.

A semiconductive layer 151 is disposed on the gate insulating layer 140. The semiconductive layer 151 includes a protrusion 154 overlapping the gate electrode 124.

A data line 171 including a source electrode 173 and a drain electrode 175 are disposed on the semiconductive layer 151.

The data line 171 transfers a data signal, is generally extended in the horizontal direction (the X direction parallel to the longer side of the substrate 110), and intersects the vertically-extending gate line 121 and the generally vertically-extending storage electrode line structure 131. The source electrode 173 protrudes toward the gate electrode 124, and is disposed on the protrusion 154 of the semiconductive layer 151. The drain electrode 175 is separated from the data line 171, and is disposed on the protrusion 154 of the semiconductive layer 151. The drain electrode 175 faces the source electrode 173 based on the gate electrode 124.

The gate electrode 124, the source electrode 173, and the drain electrode 175 defined respective parts of a single thin film transistor Q together with the protrusion 154 of the semiconductive layer 151, and a channel of the thin film transistor Q is formed on the protrusion 154 of the semiconductive layer 151 between the source electrode 173 and the drain electrode 175.

An ohmic contact functioning to lower contact resistance between the semiconductive layer 151 and the data line 171 and between the protrusion 154 of the semiconductive layer 151 and the source electrode 173 and the drain electrode 175 may be disposed therebetween. The semiconductive layer 151 may include at least one of a semiconductor such as silicon or a semiconductive oxide.

A first interlayer insulating layer 180a is disposed on the protrusion 154 of the semiconductive layer 151 and the gate insulating layer 140 between the data line 171 and the drain electrode 175, and between the source electrode 173 and the drain electrode 175. The first interlayer insulating layer 180a may include an inorganic insulator or an organic insulator such as a silicon nitride (SiNx) and a silicon oxide (SiOx).

A color filter 230, a vertical light blocking member 220a, and a horizontal light blocking member 220b are disposed on the first interlayer insulating layer 180a.

The vertical light blocking member 220a is disposed along a direction in parallel with the gate line 121, and the horizontal light blocking member 220b is disposed along a direction in parallel with the data line 171. The vertical light blocking member 220a and the horizontal light blocking member 220b are connected to each other and thereby configured in a lattice structure having an opening corresponding to an aperture area for displaying a corresponding portion of the to be formed image, and include a material through which light does not transmit.

The color filter 230 is disposed on the opening by the vertical light blocking member 220a and the horizontal light blocking member 220b, and may display one of primary colors, such as three primary colors including red, green, and blue. However, without being limited to three primary colors including red, green, and blue, the color filter 230 may also display one of cyan, magenta, yellow, and white or clear based colors. The color filter 230 may include a material for displaying the same color for each pixel adjacent in the horizontal direction, and may include a material for displaying a different color for each pixel adjacent in the vertical direction.

A second interlayer insulating layer 180b is disposed on the color filter 230, the vertical light blocking member 220a, and the horizontal light blocking member 220b. The second interlayer insulating layer 180b may include an inorganic insulator or an organic insulator such as a silicon nitride (SiNx) and a silicon oxide (SiOx). Dissimilar to the cross-sectional view of FIG. 4, in a case in which a step is formed due to a difference in a thickness between the color filter 230 and the vertical light blocking member 220a, the step may be reduced or removed by making the second interlayer insulating layer 180b include the organic insulator where the latter is planarized.

A contact hole 185 configured to expose a portion of the drain electrode 175 is formed through the vertical light blocking member 220a, and the first and second interlayer insulating layers 180a and 180b.

The pixel electrode 191 connected to the drain electrode 175 via the contact hole 185 is disposed on the second interlayer insulating layer 180b. The pixel electrode 191 may be made of a transparent conductive material such as ITO or IZO.

The entire shape of the pixel electrode 191 is a rectangular shape, and the pixel electrode 191 includes a cross-type stem including a vertical stem 191a and a horizontal stem 191b intersecting the vertical stem 191a. Also, the pixel electrode 191 is divided into four subareas by the vertical stem 191a and the horizontal stem 191b, and each subarea includes a plurality of inclined fine branches 191c. Also, in the present exemplary embodiment, the pixel electrode 191 may further include a circumferential stem surrounding the circumference of the pixel electrode 191.

In one embodiment, the fine branches 191c of the pixel electrode 191 form an angle of about 40 to 45 degrees with the gate line 121 or the vertical stem 191a. Also, the fine branches 191c of neighboring two subareas may be orthogonal to each other. Also, a width of the fine branches 191c may gradually increase, or an interval between the fine branches 191 may differ.

The pixel electrode 191 includes an extender 197 connected at a lower end of the horizontal stem 191b and having a wider area than an area of the horizontal stem 191b, is physically and electrically connected from the extender 197 to the drain electrode 175 via the contact hole 185, and is applied with a data voltage from the drain electrode 175.

The aforementioned description in relation to the thin film transistor Q and the pixel electrode 191 is an example and thus, a structure of the thin film transistor Q and a design of the pixel electrode 191 may be modified in various ways for example to improve lateral visibility in specific directions.

A lower alignment layer 11 is disposed on the pixel electrode 191, an upper alignment layer 21 is disposed on a portion facing the lower alignment layer 11, and the micro-cavity 305 is disposed between the lower alignment layer 11 and the upper alignment layer 21.

The lower alignment layer 11 and the upper alignment layer 21 may be vertical liquid crystal pre-tilting alignment layers. The lower alignment layer 11 and the upper alignment layer 21 may include at least one of materials generally used as a liquid crystal alignment layer, such as polyamic acid, polysiloxane, and polyimide.

A liquid crystal material including liquid crystal molecules 310 is introduced (e.g., via capillary action) into the micro-cavity 305 by way of a corresponding liquid crystal injection hole 307 of the micro-cavity 305. The micro-cavity 305 may be elongated along the horizontal direction and successive ones of the micro-cavities may be disposed adjacent to one another along the vertical direction. In the present exemplary embodiment, an alignment material used to form the lower and upper alignment layers 11 and 21 and the liquid crystal material including the liquid crystal molecules 310 may be pre-injected into the micro-cavity 305 using a capillary force before the liquid crystal material is introduced.

Horizontally adjacent ones of the micro-cavities 305 are divided from one another in the horizontal direction by corresponding ones of a plurality of liquid crystal injection hole forming areas (troughs) 307FP positioned at a portion overlapping the respective gate lines 121. In other words, the plurality of liquid crystal injection holes for the micro-cavities 305 is distributively formed along a direction in which the gate line 121 is extended. Each of the plurality of formed micro-cavities 305 may correspond to a single pixel, and the pixel may correspond to an area for displaying a pixel portion of an image.

The common electrode 270 and the lower insulating layer 350 are disposed on the upper alignment layer 21. The common electrode 270 is applied with a common voltage, generates an electric field together with the pixel electrode 191 to which a data voltage is applied, and thereby determines a direction in which the liquid crystal molecules 310 containerized within in the respective micro-cavity 305 between the common electrode 270 and the pixel electrode 191 are tilted. The common electrode 270 constitutes a capacitor together with the pixel electrode 191 and thereby maintains the applied voltage even after the thin film transistor is turned off. The lower insulating layer 350 includes a silicon nitride (SiNx) or a silicon oxide (SiO2).

Even though the present exemplary embodiment describes that the common electrode 270 is formed on the micro-cavity 305, the common electrode 270 according to another exemplary embodiment may be formed below the micro-cavity 305 and thereby drive liquid crystal in a coplanar electrode (CE) mode.

The roof layer 360 is disposed on the lower insulating layer 350. The roof layer 360 performs a supporting role so that the micro-cavity 305 that is an in-between space may be formed between the pixel electrode 191 and the common electrode 270. The roof layer 360 may include photoresist or other organic materials.

The upper insulating layer 370 is disposed on the roof layer 360. The upper insulating layer 370 may contact with a top surface of the roof layer 360. The upper insulating layer 370 includes a silicon nitride (SiNx) or a silicon oxide ($SiO_2$).

A capping layer 390 is disposed on the upper insulating layer 370 and the liquid crystal injection hole forming area 307FP. The capping layer 390 covers the liquid crystal injection holes 307 of the micro-cavities 305 where the micro-cavities are; before capping, exposed by the liquid crystal injection holes forming area 307FP. The capping layer 390 fills the liquid crystal injection holes forming area 307FP after the insertion of the liquid crystal material into the micro-cavities 305 is complete. The capping layer 390 includes an organic material or an inorganic material.

Meanwhile, as illustrated in FIG. 5, the PWP is disposed between vertically neighboring micro-cavities 305. In other words, the PWP may be formed as extending along the same direction in which the data line 171 is extended, and may be covered by the roof layer 360. The lower insulating layer 350, the common electrode 270, the upper insulating layer 370, and the roof layer 360 fill in the PWP. The above structure may partition or define the separated micro-cavities 305 by forming a partition wall.

Hereinafter, a manufacturing method of an LCD according to an exemplary embodiment will be described with reference to FIGS. 6 through 16 and FIGS. 3 through 5. The exemplary embodiment described in the following is an exemplary embodiment of the manufacturing method and thus, may be modified in another form and thereby implemented.

FIGS. 6 through 16 are cross-sectional views illustrating a manufacturing method of an LCD according to an exemplary embodiment of the present disclosure of invention. FIGS. 6, 8, 10, 12, 13, and 15 illustrate cross-sectional views, taken along the cutting-plane line IV-IV of FIG. 3, in an order of the manufacturing method. FIGS. 7, 9, 11, 14, and 16 illustrate cross-sectional views, taken along the cutting-plane line V-V of FIG. 3, in an order of the manufacturing method.

Figure 6:
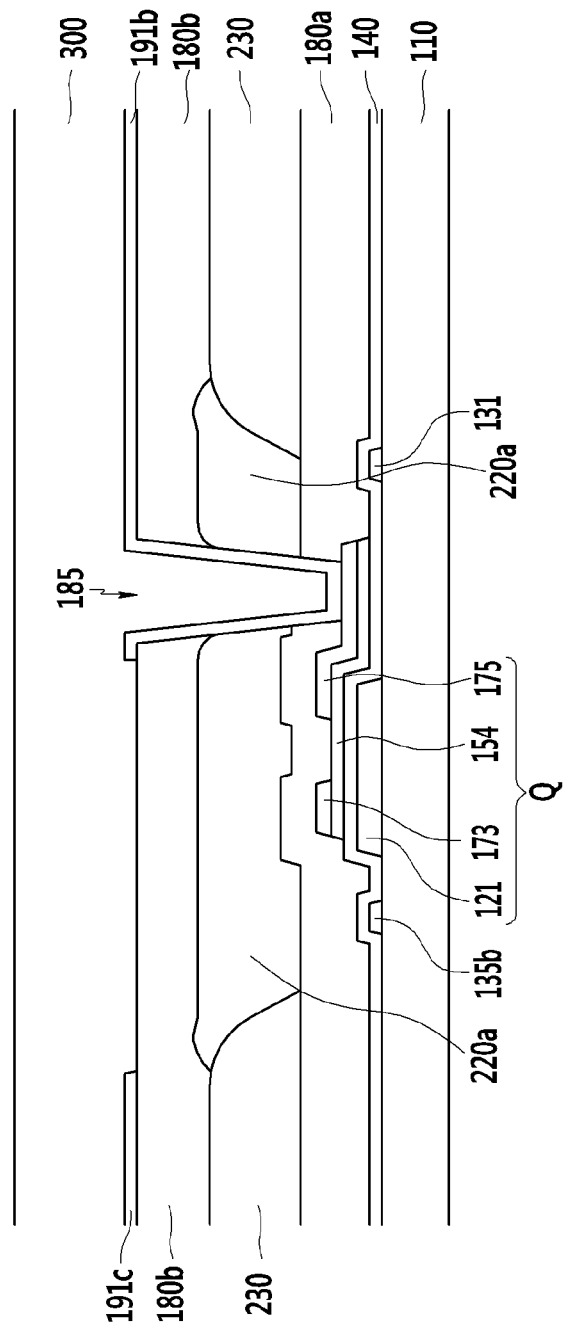
FIGS. 6 through 16 are cross-sectional views illustrating a manufacturing method of an LCD according to the first exemplary embodiment.
Figure 7:
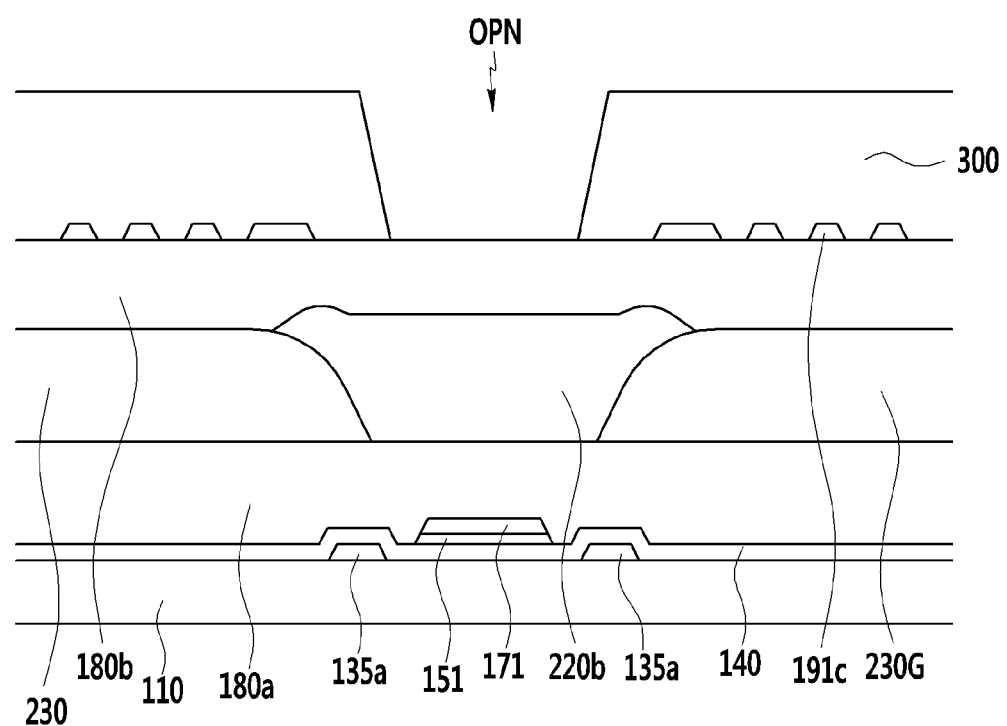

Referring to FIGS. 3, 6, and 7, the gate line 121 and the storage electrode line 131 are formed on the substrate 110, and the gate insulating layer 140 is formed on the gate line 121 and the storage electrode line 131. Same conductive materials may be used in simultaneously forming the gate lines 121 and the storage electrode lines 131. Next, the semiconductive layer 151 is formed on the gate insulating layer 140 and then, the data line 171 and the drain electrode 175 are formed on the semiconductive layer 151.

Here, the gate line 121 and the storage electrode line 131 are extended in the vertical direction, and the data line 171 intersects the gate line 121 and the storage electrode line 131 and is extended in the vertical direction. Also, the gate line 121 includes the gate electrode 124 protruding in the horizontal direction, and the semiconductive layer 151 includes the protrusion 154 overlapping the gate electrode 124. The data line 171 includes the source electrode 173 protruding toward the gate electrode 124 and formed on the protrusion 154 of the semiconductive layer 151. The drain electrode 175 is separated from the data line 171, is formed on the protrusion 154 of the semiconductive layer 151, and faces the source electrode 173 based on the gate electrode 124.

The first interlayer insulating layer 180a is formed on the protrusion 154 of the semiconductive layer 151 and the gate insulating layer 140 between the data line 171 and the drain electrode 175, and between the source electrode 173 and the drain electrode 175. The color filter 230, the vertical light blocking member 220a, and the horizontal light blocking member 220b are formed on the first interlayer insulating layer 180a.

Here, the vertical light blocking member 220a is formed along a direction in parallel with the gate line 121, and the horizontal light blocking member 220b is formed along a direction in parallel with the data line 171. The vertical light blocking member 220a and the horizontal light blocking member 220b are connected to each other and thereby configures a lattice structure having an opening (aperture). The color filter 230 is formed on the opening by the vertical light blocking member 220a and the horizontal light blocking member 220b.

The second interlayer insulating layer 180b is formed on the color filter 230, the vertical light blocking member 220a, and the horizontal light blocking member 220b. Next, the contact hole 185 configured to expose a portion of the drain electrode 175 is formed on the vertical light blocking member 220a and the first and second interlayer insulating layers 180a and 180b.

The pixel electrode 191 is connected to the drain electrode 175 via the contact hole 185 and is formed on the second interlayer insulating layer 180b, and a sacrificial layer 300 is formed on the pixel electrode 191. As illustrated in FIG. 5, the opening (OPN) is formed on the sacrificial layer 300 along a direction in parallel with the data line 171. Here, the OPN is formed on a portion corresponding to the horizontal light blocking member 220b.

Figure 8:
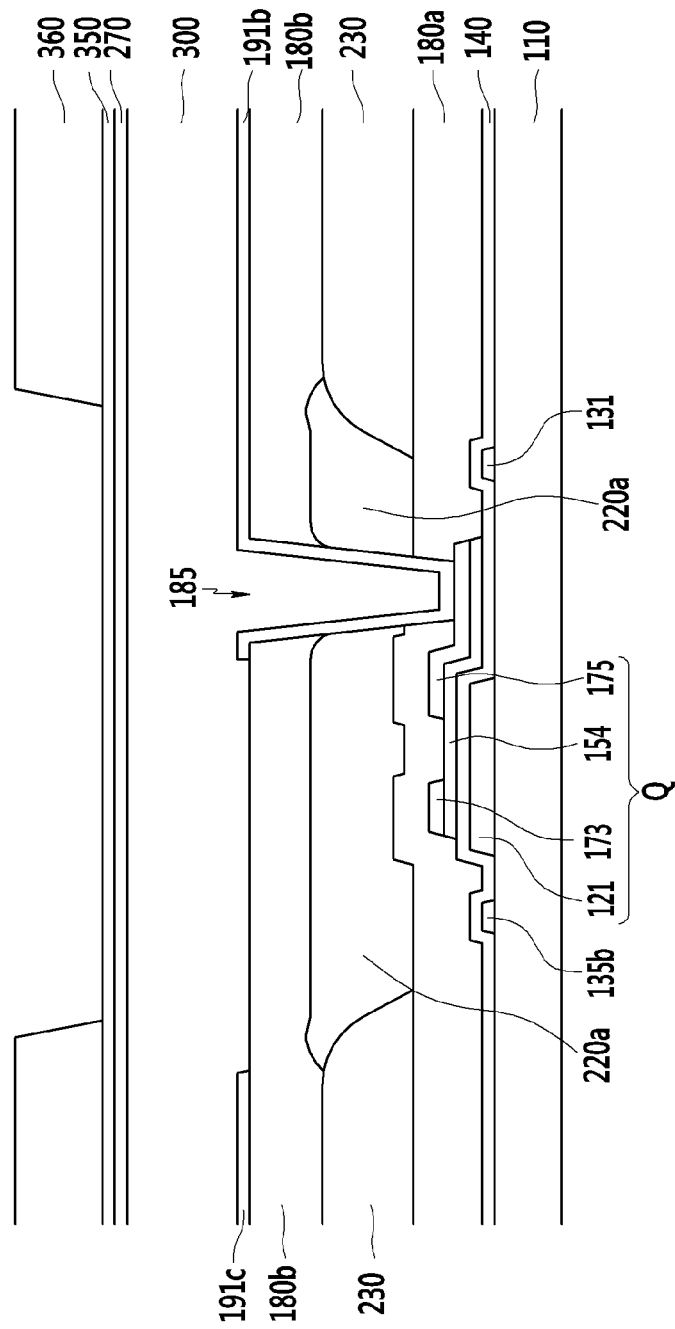
Figure 9:
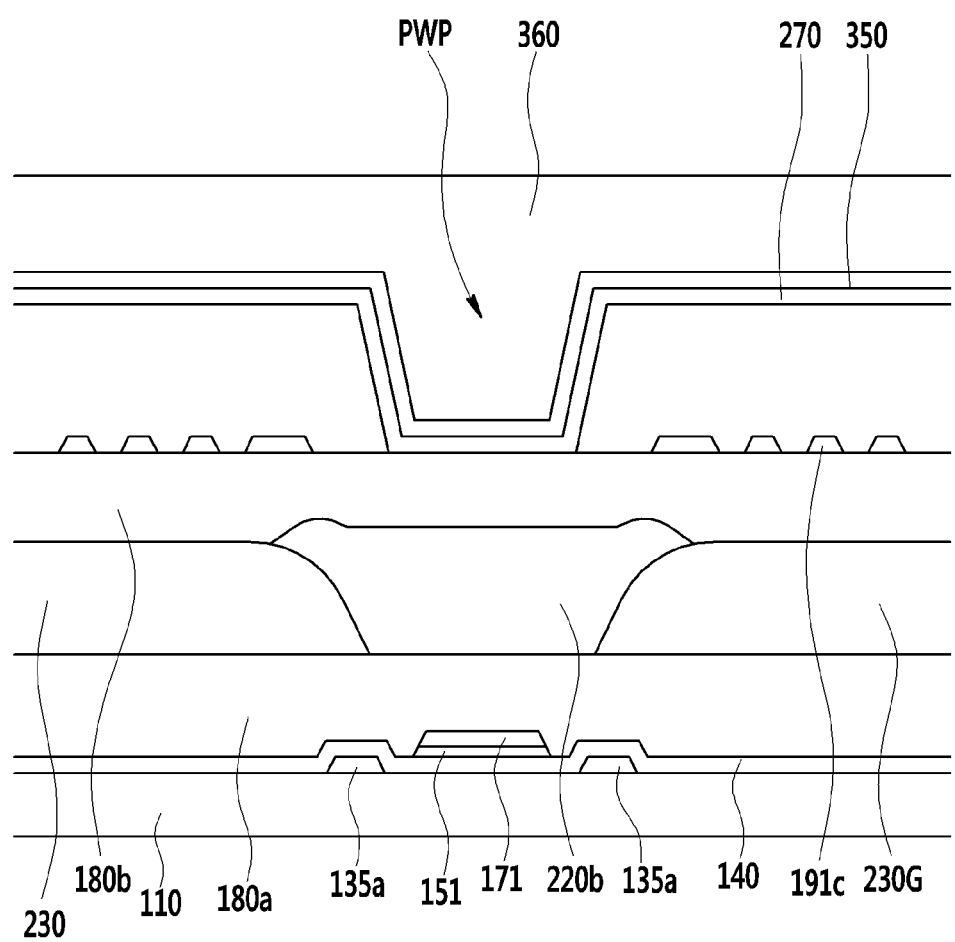

Referring to FIGS. 8 and 9, the common electrode 270, the lower insulating layer 350, and the roof layer 360 are sequentially formed on the sacrificial layer 300.

In this instance, by removing the roof layer 360 of a portion corresponding to the vertical light blocking member 220a positioned between neighboring pixels in the horizontal direction through an exposure and development process, the lower insulating layer 350 is externally exposed from the portion corresponding to the vertical light blocking member 220a. Also, the common electrode 270, the lower insulating layer 350, and the roof layer 360 form under the PWP when the latter is filled into the OPN opening.

Figure 10:
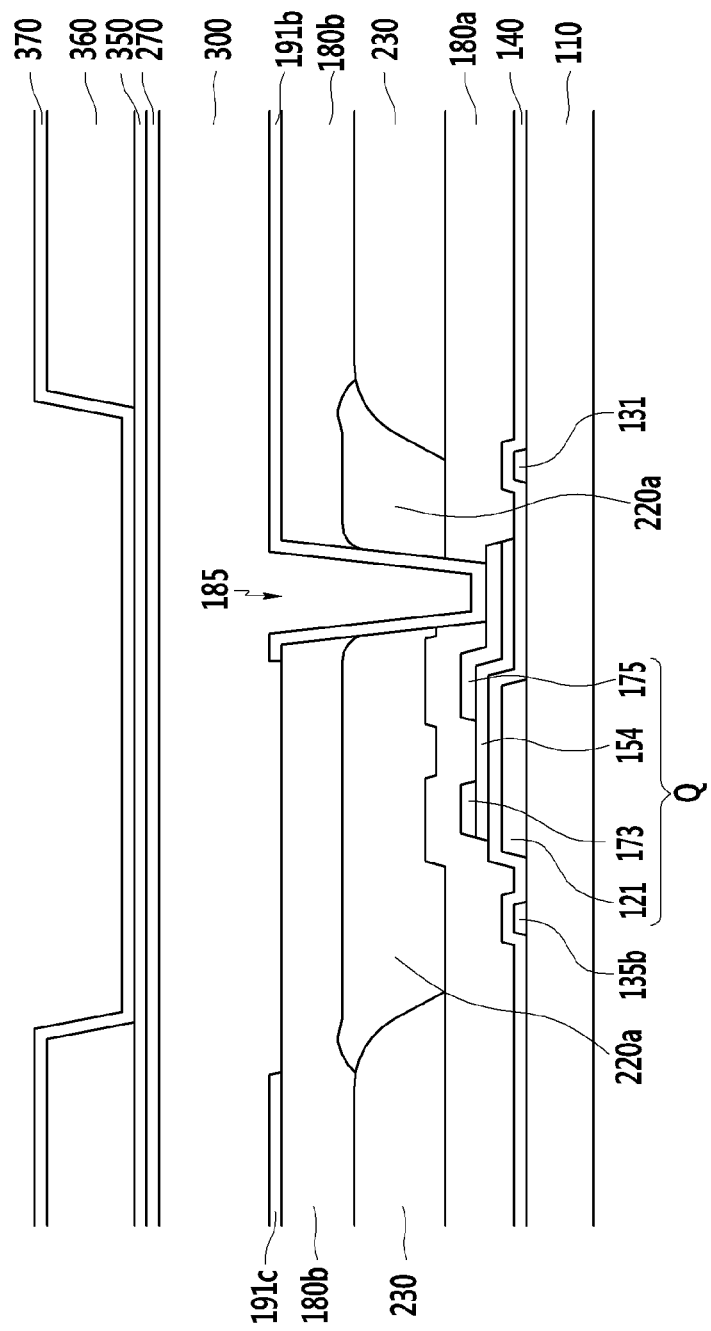
Figure 11:
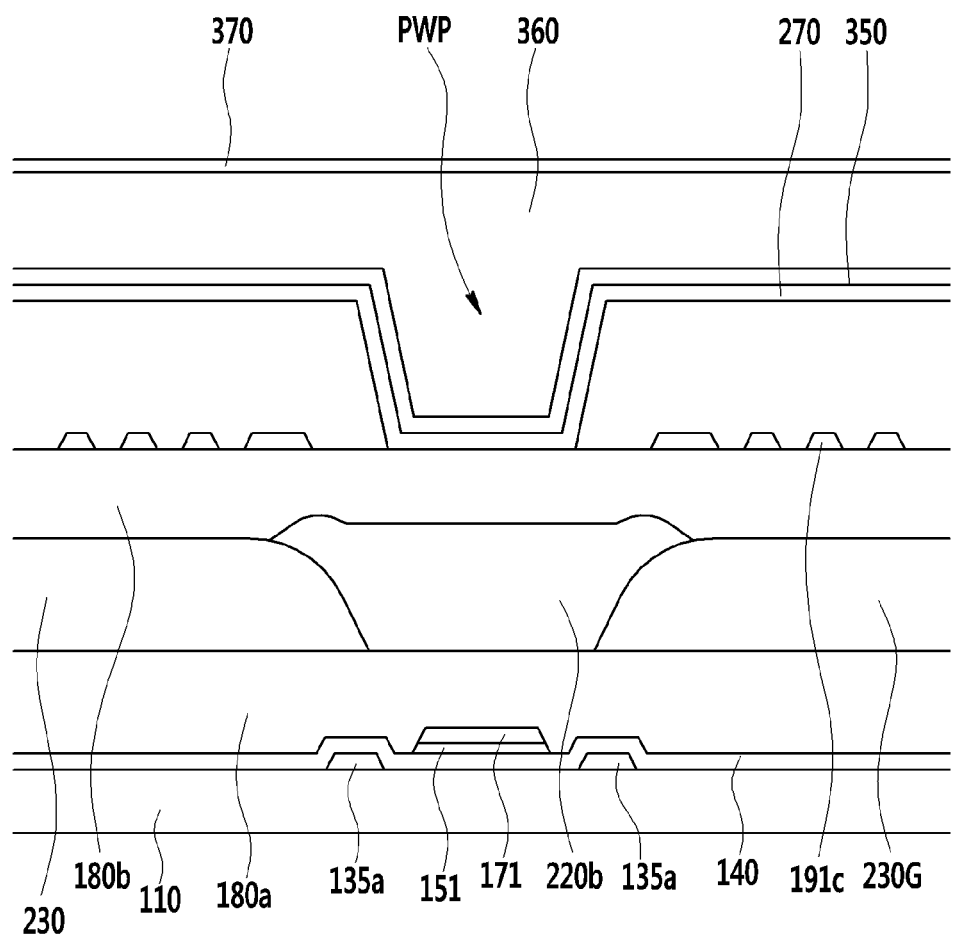

Referring to FIGS. 10 and 11, the upper insulating layer 370 is formed to cover the roof layer 360 and the exposed lower insulating layer 350.

Figure 12:
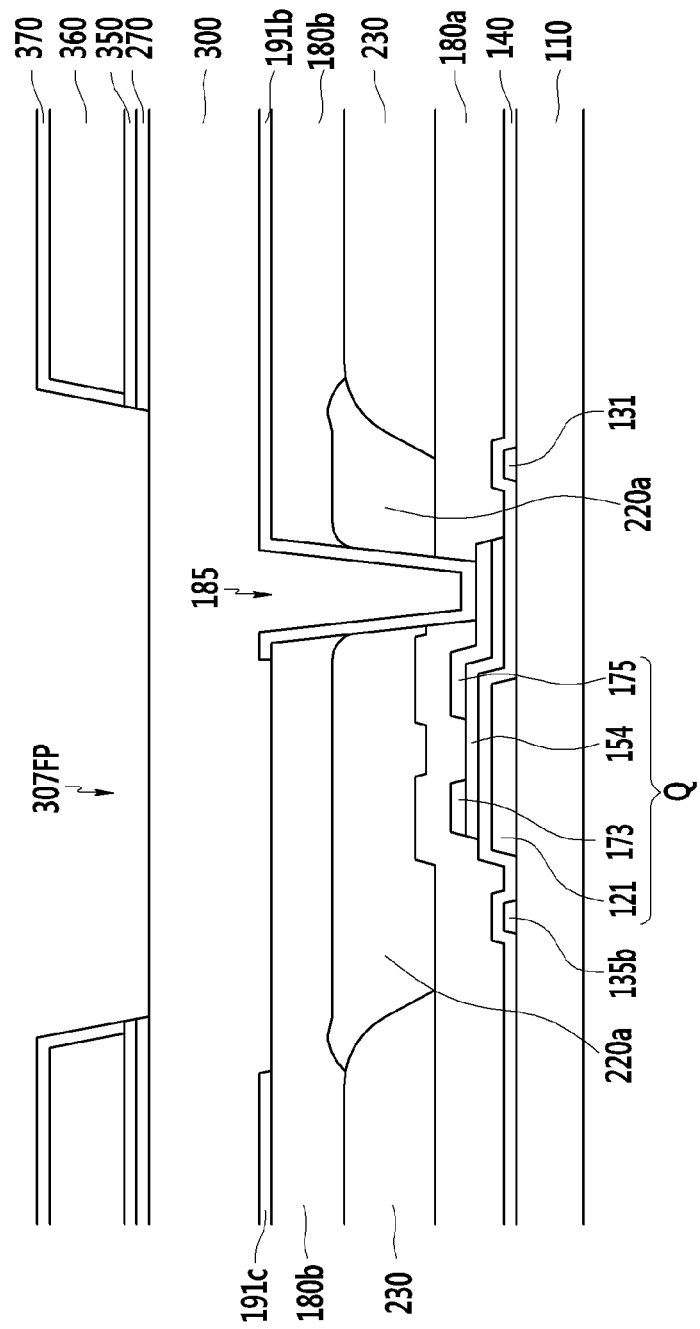

Referring to FIG. 12, by selectively etching where indicated through the upper insulating layer 370, the lower insulating layer 350, and the common electrode 270 of the portion corresponding to the vertical light blocking member 220a, the liquid crystal injection holes forming area (trough) 307FP is formed. Here, etching of the upper insulating layer 370, the lower insulating layer 350, and the common electrode 270 may be performed using dry etching.

In this instance, the upper insulating layer 370 may have a structure that covers a side surface of the roof layer 360, however, is not limited thereto. The upper insulating layer 370 covering the side surface of the roof layer 360 may be selectively removed so that the side surface of the roof layer 360 may be externally exposed by way of the liquid crystal injection holes forming area (trough) 307FP.

Figure 13:
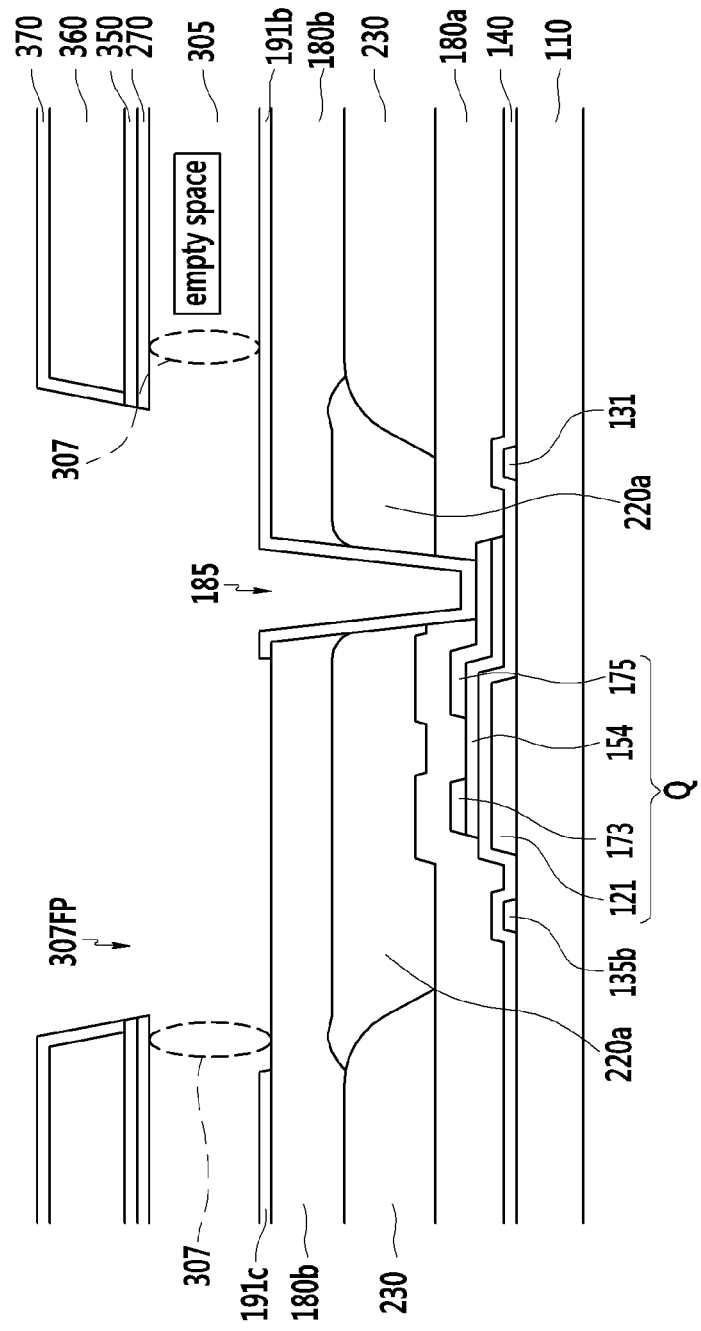
Figure 14:
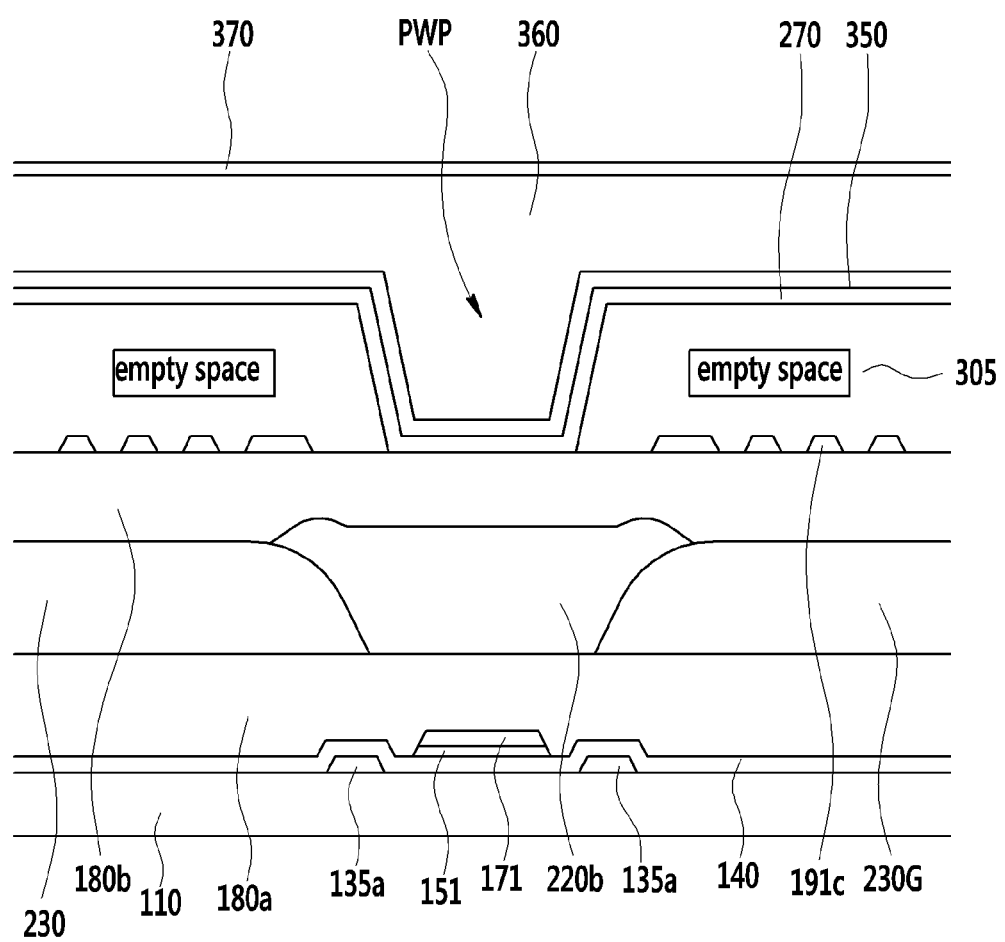

Referring to FIGS. 13 and 14, through the liquid crystal injection hole forming area 307FP, the sacrificial layer 300 is selectively removed for example using an ashing processing method using an $O_2$ gas, a wet etching method, and the like. In this instance, the respective micro-cavities 305 having the respective liquid crystal injection holes 307 are formed along the interior sidewalls of the liquid crystal injection holes forming area (trough) 307FP. Each micro-cavity 305 is in an empty space state formed because the sacrificial layer 300 has been removed therefrom.

Figure 15:
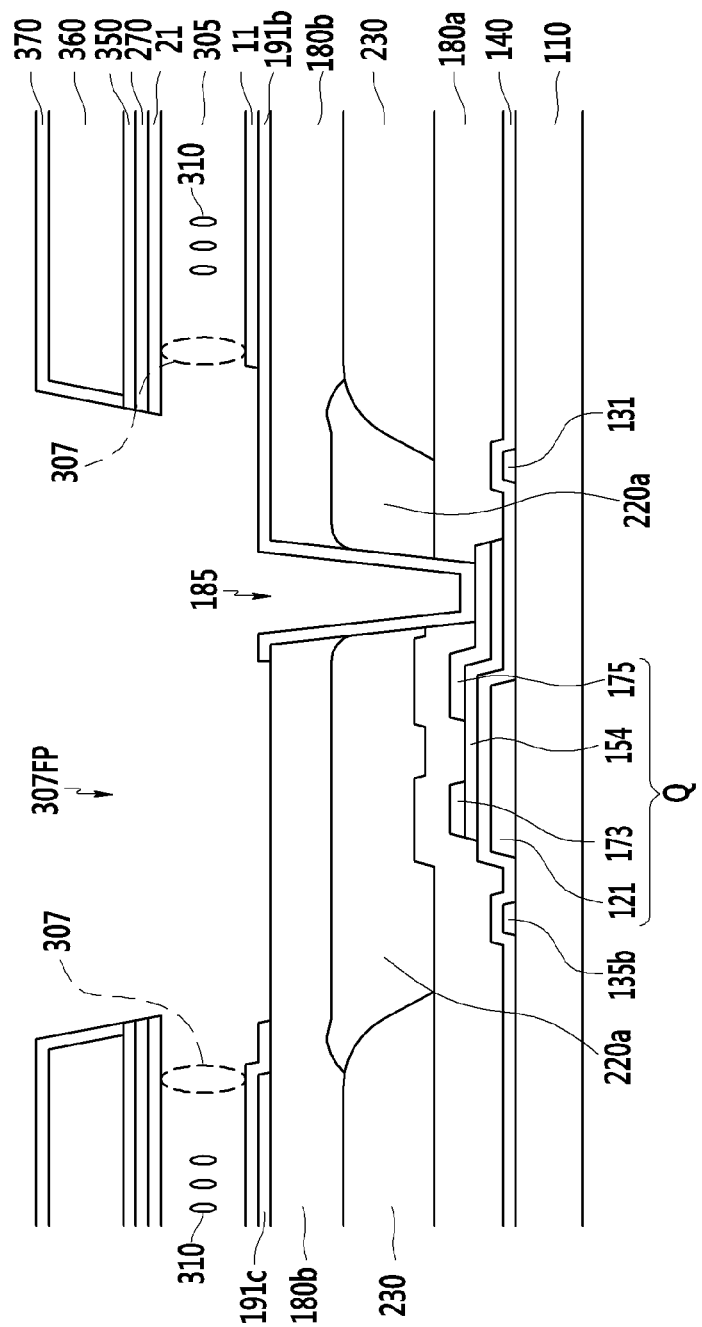
Figure 16:
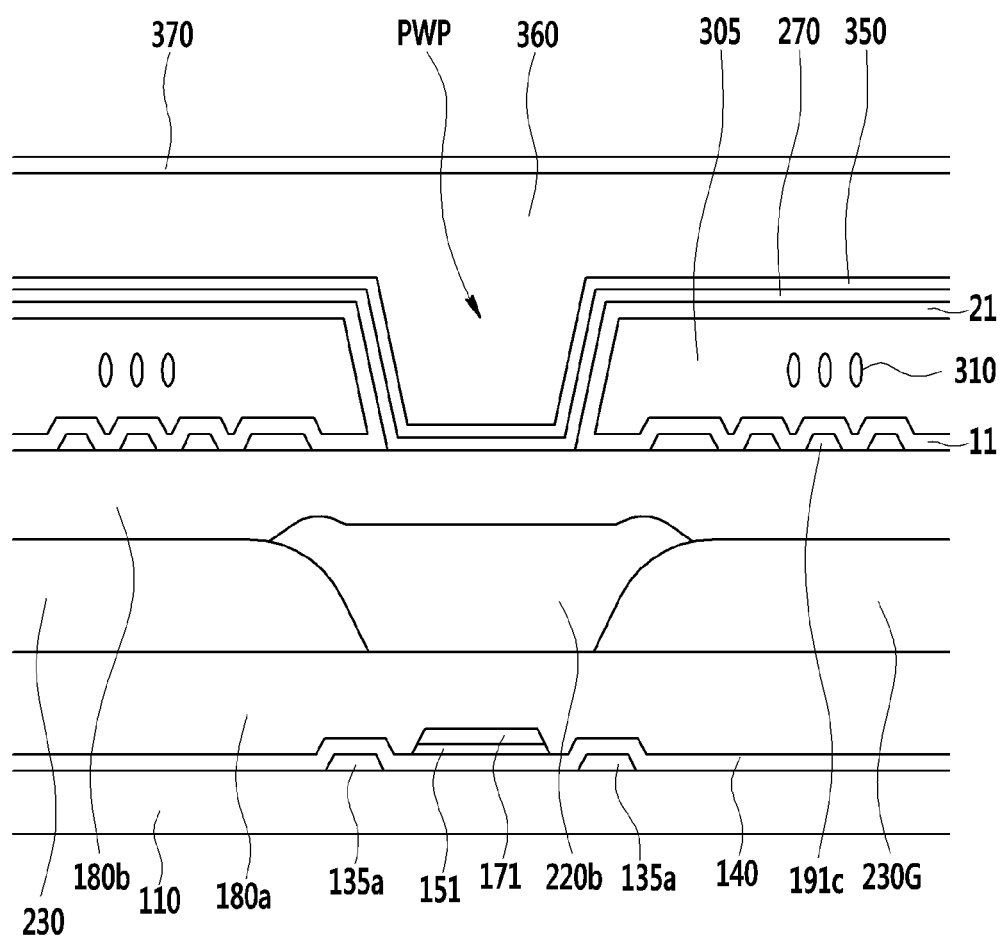

Referring to FIGS. 15 and 16, the lower alignment layer 11 and the upper alignment layer 21 are formed by injecting an alignment material into the micro-cavity 305 via the liquid crystal injection hole 307. Specifically, a bake process is performed after injecting an alignment material including a solid content and a volatile solvent into the micro-cavity 305 via the liquid crystal injection hole 307. In this instance, the lower alignment layer 11 is formed on the pixel electrode 191, and the upper alignment layer 21 is formed on one surface of the common electrode 270.

Next, a liquid crystal material including the liquid crystal molecules 310 is injected (e.g., introduced via capillary action) into the micro-cavity 305 via the liquid crystal injection hole 307, for example by using an inkjet method or the like.

Referring to FIGS. 4 and 5, the capping layer 390 is formed on the upper insulating layer 370 to cover the liquid crystal injection hole 307. The capping layer 390 may cover the liquid crystal injection holes forming area 307FP and thus cap shut its previously open, liquid crystal injection holes 307. The capping layer 390 may be formed by pushing a capping material from one edge of the substrate 110 to an opposite edge thereof using a bar coater and then at the same time, curing the capping material using ultraviolet rays.

Hereinafter, an LCD according to another exemplary embodiment of the present disclosure of invention will be described with reference to FIGS. 17 through 19.

Figure 17:
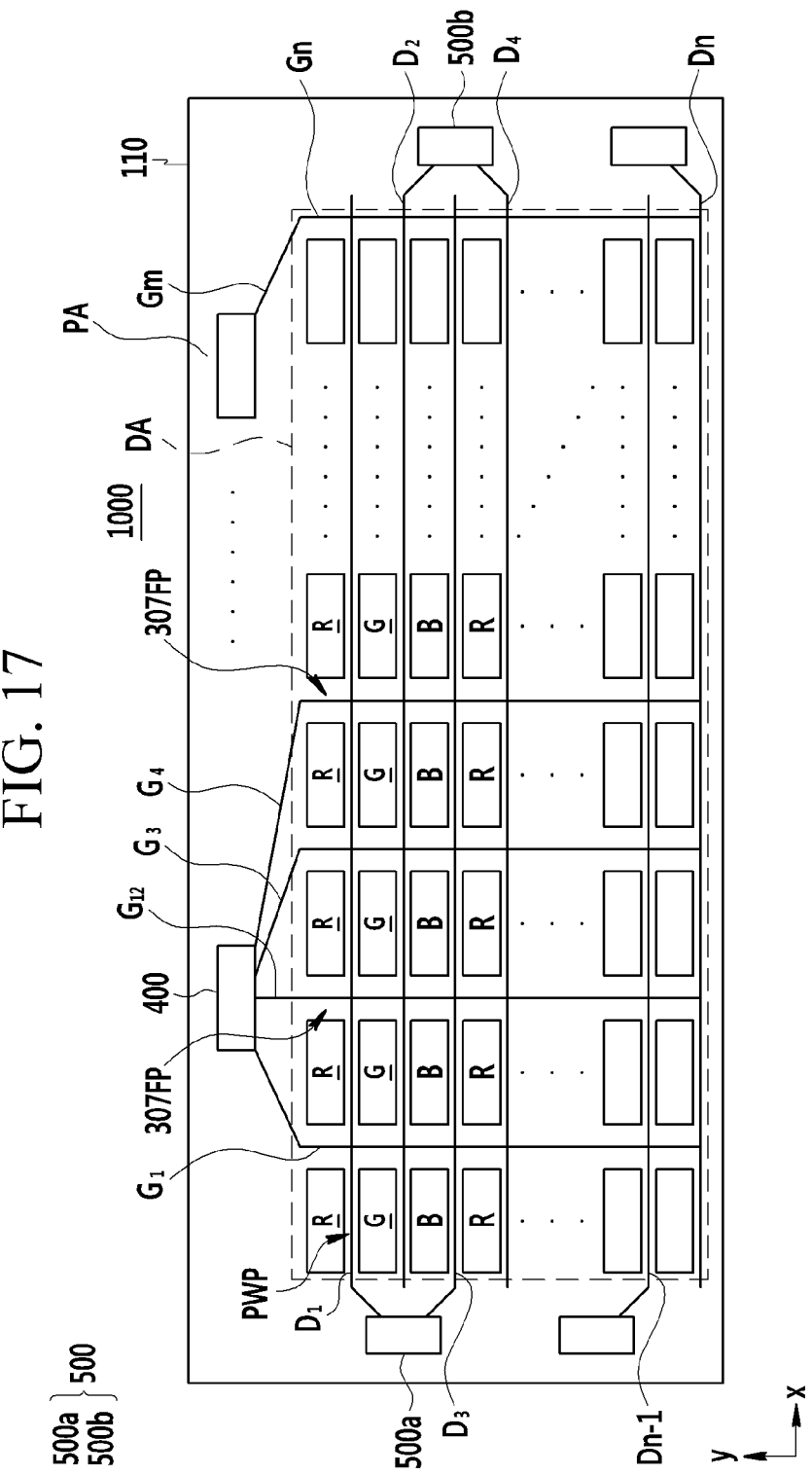
FIG. 17 is a view of an LCD according to another exemplary embodiment.

FIG. 17 is a view of an LCD according to another exemplary embodiment of the present disclosure. FIG. 18 is a layout view illustrating a portion of the LCD of FIG. 17. FIG. 19 is a cross-sectional view taken along cutting-plane line XIX-XIX of FIG. 18.

Figure 18:
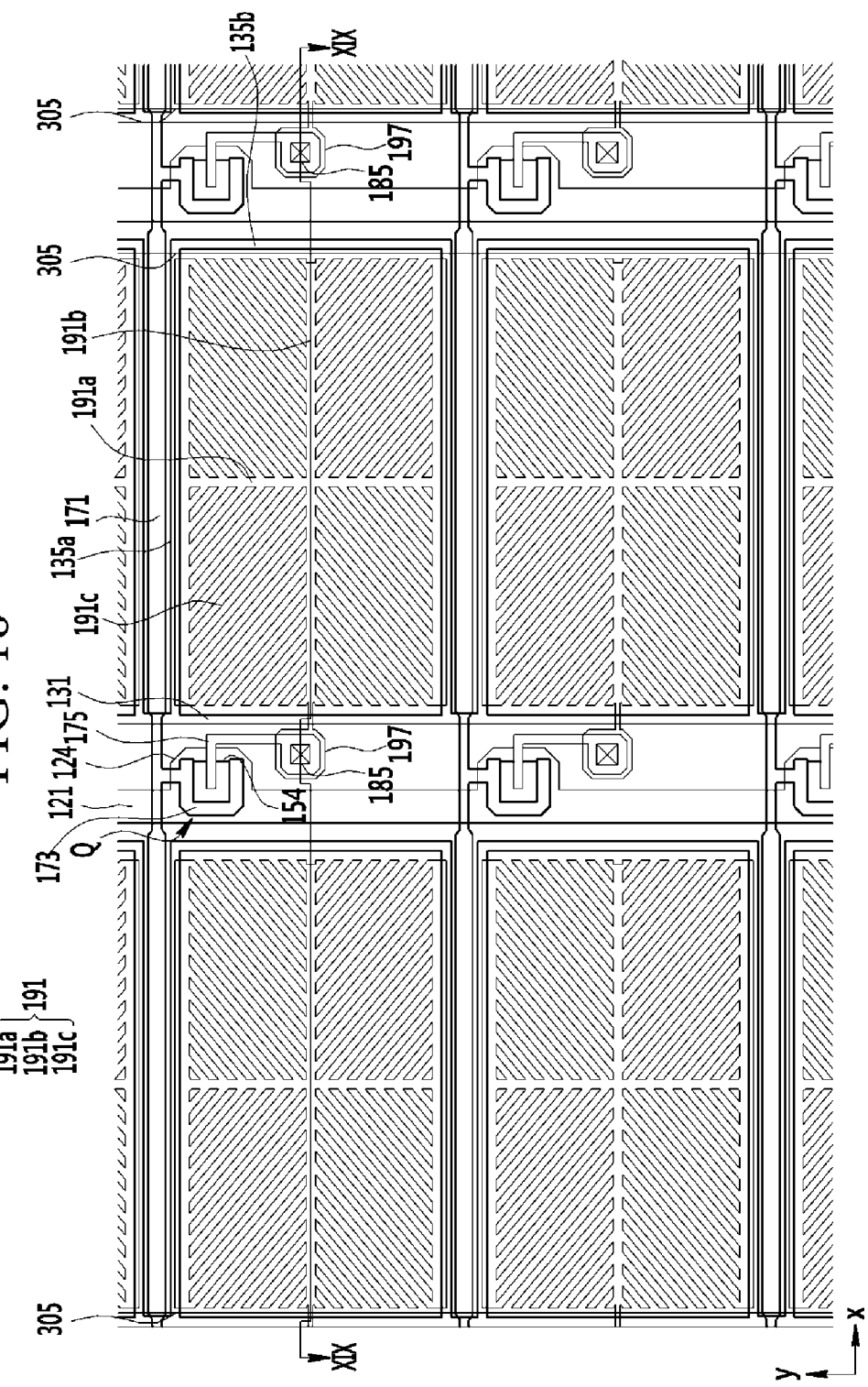
FIG. 18 is a more detailed layout view illustrating a repeated portion of the LCD of FIG. 17.
Figure 19:
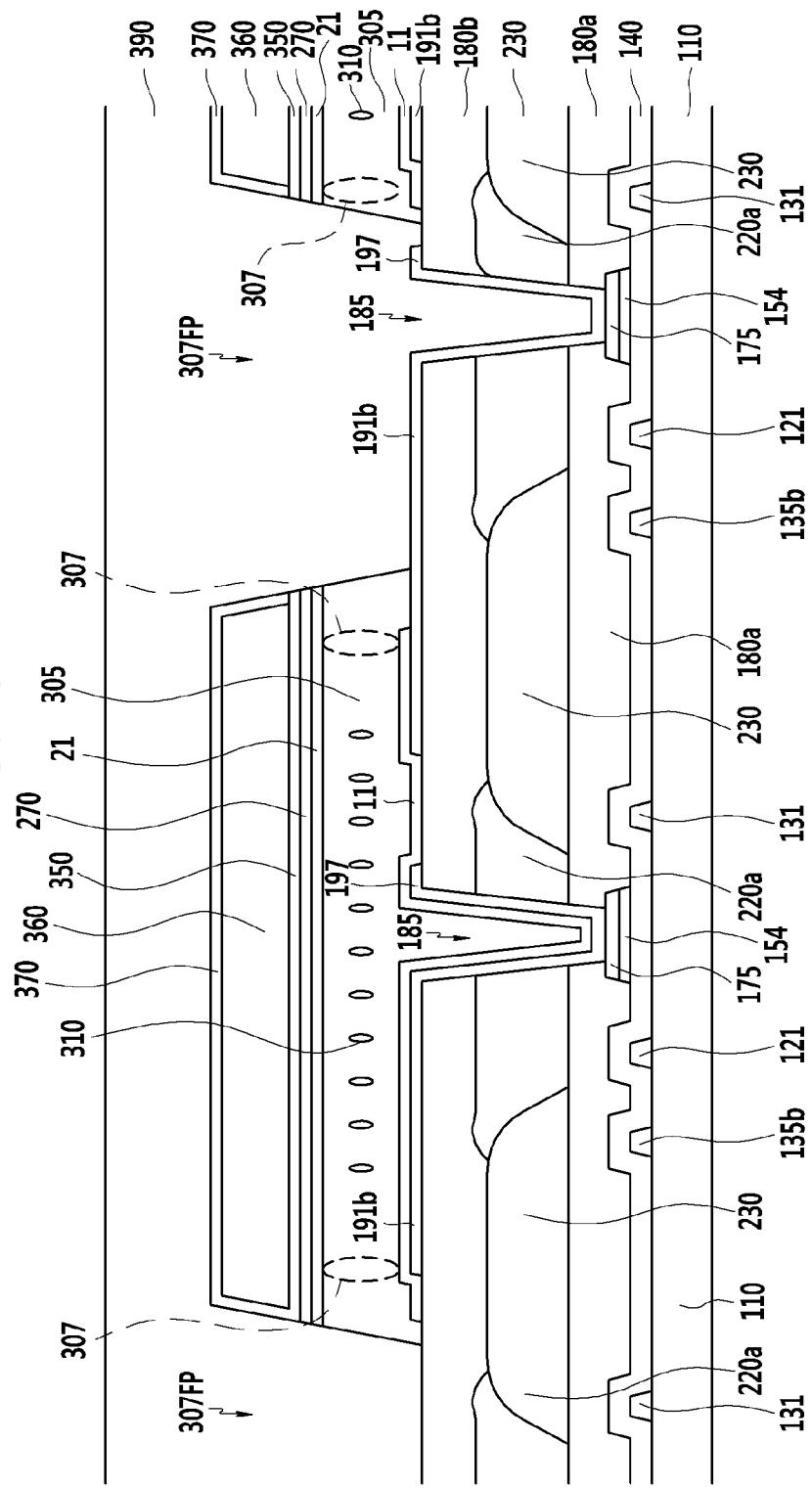
FIG. 19 is a cross-sectional view taken along cutting-plane line XIX-XIX of FIG. 18.

Referring to FIGS. 17 and 18, compared to the LCD of FIG. 1, the LCD according to the present exemplary embodiment has the same structure except for the liquid crystal injection hole forming areas (troughs) 307FP not being disposed between each column of pixels but rather between every other of successive column of the pixels.

Accordingly, a description of the same structure is omitted.

As indicated above, in FIG. 17 the liquid crystal injection holes forming areas 307FP are shown to be disposed between respective two pixels consecutively continued in the direction in which the long side of each pixel is extended, that is, the horizontal direction. Accordingly, each single micro-cavity 305 is filled in with liquid crystal material from only one end thereof instead of from both horizontal ends thereof. That is, the lower insulating layer 350, the common electrode 270, the upper insulating layer 370, and the roof layer 360, which are a structure constituting pairs of simultaneously filled and horizontally adjacent micro-cavities 305, are disposed to correspond to the two pixels consecutively continued and filed at the same time.

Also, without being limited thereto, a single micro-cavity 305 may be disposed to correspond to at least three pixels consecutively continued and filled at the same time by providing connection tunnels between such micro-cavities.

While the present disclosure of invention has been provided in connection with what is presently considered to be practical exemplary embodiments, it is to be understood that the present teachings are not limited to the disclosed embodiments, but, on the contrary, are intended to cover various modifications and equivalent arrangements included within the spirit and scope of the present teachings.

What is claimed is:

1. A liquid crystal display comprising:
a substrate having a substantially rectangular shape comprising a pair of opposed long sides and a pair of opposed and comparatively shorter sides, the substrate being subdivided into a display area configured for displaying an image and a non-displaying peripheral area positioned adjacent the display area;
a plurality of pixels arranged within the display area, wherein:
  each pixel has a respective thin film transistor and a corresponding a pixel electrode connected to the thin film transistor;
  each pixel has additionally has a respective roof layer portion disposed apart from and facing the respective pixel electrode, there being a micro-cavity defined between the pixel electrode and the roof layer portion and a liquid crystal material substantially containerized by the micro-cavity,
wherein each pixel is provided with a rectangular shape comprising a pair of opposed pixel long sides and a pair of opposed and comparatively shorter pixel short sides, where the pixel long sides are substantially parallel to the long sides of the substrate, and the pixel short sides are substantially parallel to the shorter side of the substrate,
wherein the substrate is bent such that its long sides are not straight when viewed from the side of the substrate, and
a liquid crystal injection holes forming area is provided to separate the micro-cavities where the liquid crystal injection holes forming area is extended in a direction parallel to the direction which the short sides of the substrate are extended.

2. The liquid crystal display of claim 1, further comprising:
a gate line connected to the thin film transistor, and configured to transfer a gate signal to each pixel; and
a data line connected to the thin film transistor, and configured to transfer a data signal to each pixel,
wherein the gate line is extended in the direction in which the long side of the substrate is extended, and the data line is extended in the direction in which the short side of the substrate is extended.

3. The liquid crystal display of claim 2, further comprising:
a plurality of gate lines driver circuits disposed in the peripheral area and connected to the gate lines; and
a plurality of data lines driver circuits disposed in the peripheral area and connected to the data line.

4. The liquid crystal display of claim 3, wherein the gate lines driver circuits are disposed along a long side portion of the substrate.

5. The liquid crystal display of claim 4, wherein the gate lines driver circuits are monolithically integrated on the substrate.

6. The liquid crystal display of claim 5, wherein the data lines driver circuits comprise a plurality of first data driver circuits and a plurality of second data driver circuits respectively disposed on opposed short side portions of the substrate.

7. The liquid crystal display of claim 6, wherein an odd numbered data line among the data lines is connected to the first data driver circuit, and
an even numbered data line among the data lines is connected to the second data driver circuit.

8. The liquid crystal display of claim 1, wherein the micro-cavity comprises an area corresponding to a single pixel.

9. The liquid crystal display of claim 8, wherein the liquid crystal injection holes forming area is disposed between the respective pixels in the direction in which the long side of the substrate is extended.

10. The liquid crystal display of claim 1, wherein each micro-cavity is elongated in the direction in which the long side of the substrate is extended.

11. The liquid crystal display of claim 10, wherein the liquid crystal injection holes forming area is disposed between two or more pixels consecutively continued in the direction in which the long side of the substrate is extended.

12. The liquid crystal display of claim 1, further comprising a capping layer disposed on the roof layer,
wherein the capping layer covers and seals closed the liquid crystal injection holes forming area.

13. The liquid crystal display of claim 12, further comprising a common electrode and a lower insulating layer disposed between the micro-cavity and the roof layer,
wherein the lower insulating layer is disposed on the common electrode.

14. The liquid crystal display of claim 13, further comprising an upper insulating layer disposed between the roof layer and the capping layer.

* * * * *